Feb. 27, 1934.  A. N. BENN  1,948,839
MEAT SHAPING AND SUPPORTING DEVICE
Filed Oct. 3, 1931  2 Sheets-Sheet 1
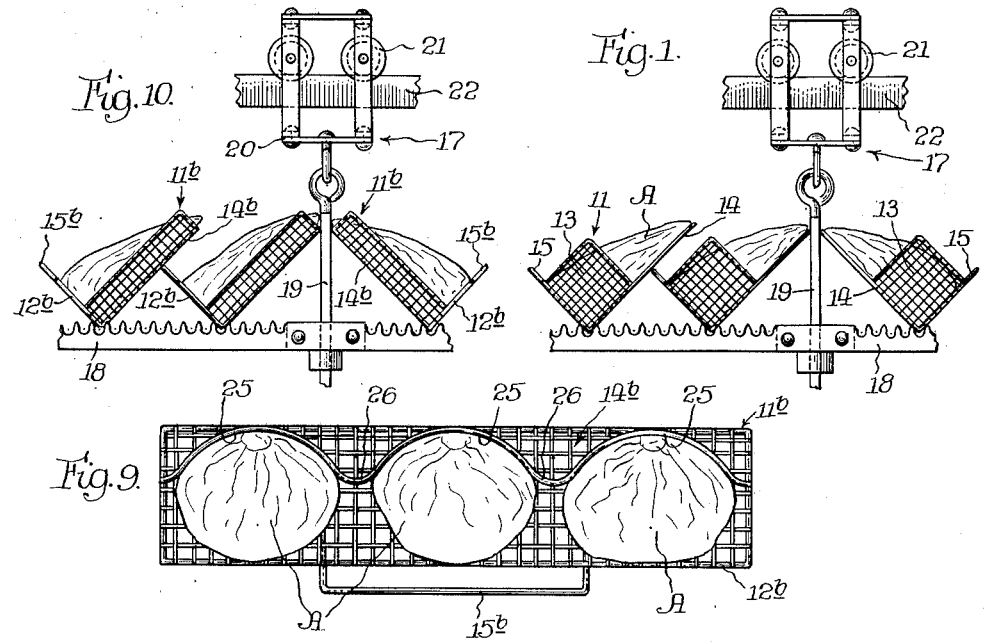
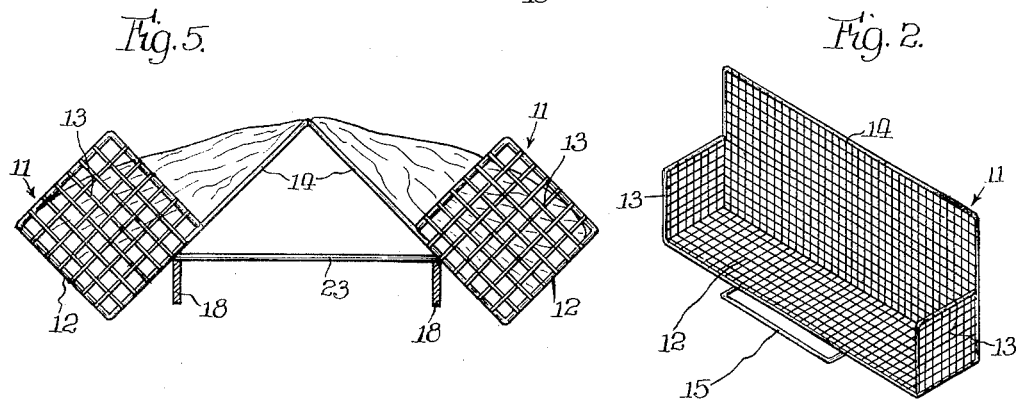
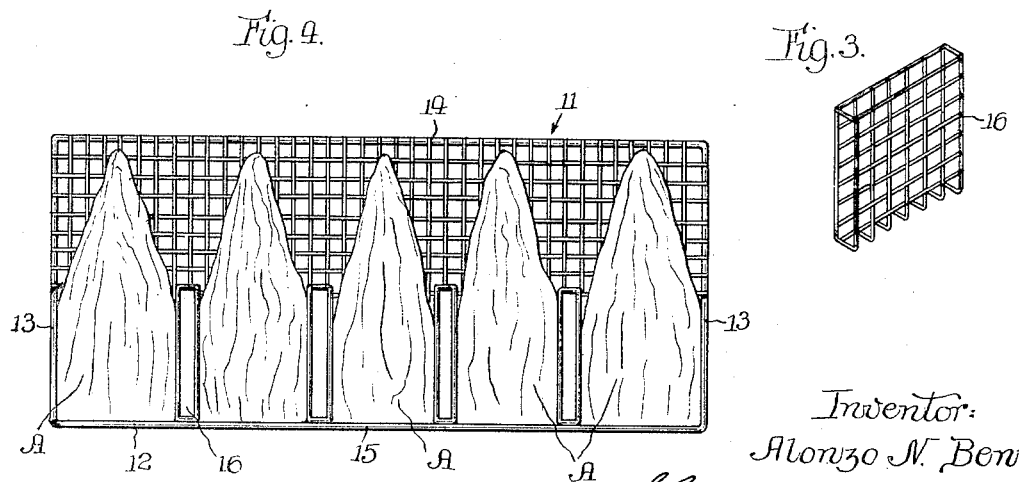
Inventor:
Alonzo N. Benn,
Hill & Hill. Attys.

Feb. 27, 1934.  A. N. BENN  1,948,839
MEAT SHAPING AND SUPPORTING DEVICE
Filed Oct. 3, 1931  2 Sheets-Sheet 2
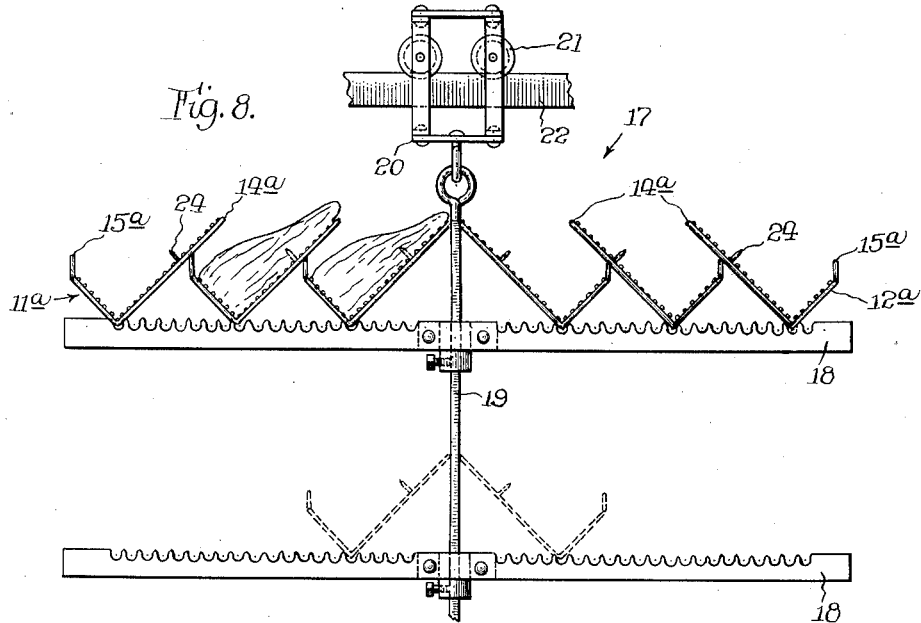
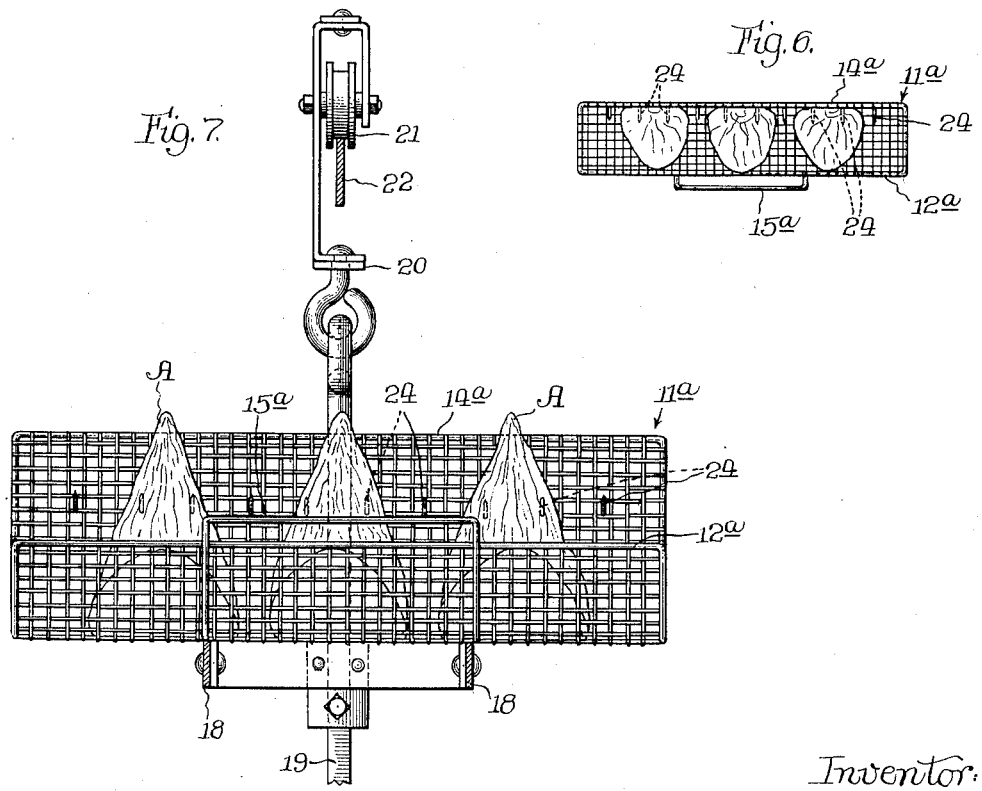

Patented Feb. 27, 1934

1,948,839

UNITED STATES PATENT OFFICE 1,948,839

MEAT SHAPING AND SUPPORTING DEVICE

Alonzo N. Benn, Chicago, Ill.

Application October 3, 1931. Serial No. 566,658

4 Claims. (Cl. 99—2)

This invention relates to the treatment and handling of meat, and particularly to a device for forming or shaping pieces of meat, and maintaining them in desired form while handling the pieces during subsequent treatment or processing thereof.

The present invention is particularly adapted for use in the forming or shaping of dried beef, hams, beef tongues, boneless shoulder butts, or the like, and for maintaining the pieces in desired form or shape during the drying and/or smoking process to which the meat is subjected.

In the ordinary handling of meats, particularly processed or treated meats such as dried beef, boneless shoulder butts, beef tongues, etc., during the drying or smoking process for example, considerable difficulty has been encountered in obtaining a finished product of desired form and appearance.

When the meats, such, for example, as those above mentioned are ready for the drying or smoking process, they are usually in a soft, pliable condition and various methods and devices have been employed for handling and supporting the pieces during the various treatments to which the meat is subjected, for example, the hams, tongues, etc., have been hung from loops of twine, supported directly on hooks passed through the piece adjacent one end, and otherwise supported in various ways, all of which methods have been found objectionable due to the perforating of the piece, and the fact that all permit the soft, pliable piece of meat to sag and become elongated in certain portions due to the action of gravity, and to shrink in other portions due to muscular contraction. This sagging and shrinking causes the piece to assume an irregular form and the larger or butt portion thereof to become rounded, irregular in form, and difficult to slice without considerable waste.

All of these objectionable effects contribute to the production of an unsightly product and the necessity of trimming away ragged, uneven portions of the piece before a full slice may be obtained, thereby resulting in a vast amount of waste.

One of the objects, therefore, of the present invention is to produce a finished product of suitable form and shape which will eliminate the necessity of trimming away a considerable portion of the ends or edges before a full or complete slice can be cut from the piece, and to eliminate the objectionable perforations adjacent the supporting ends of the pieces due to the insertion of the cords or twine by which the strips have heretofore been hung during the drying, smoking or other processing thereof. Furthermore, as previously stated, a beef ham, for example, handled in the ordinary way does not present a particularly pleasing or appetizing appearance, while a ham handled in a device of my improved construction during the processing thereof, presents a product, as in the present instance, of regular form having a substantially flat butt end portion suitably shaped for slicing without the necessity of trimming away small or undesirable cuts from the piece, and in general, producing a piece of most desirable and attractive appearance.

In addition to the above mentioned advantages obtained from the use of my present invention, there is the further advantage of obtaining a product of suitable form which readliy adapts itself to a slicing machine by which the piece is cut up into slices of substantially uniform thickness without the waste resulting in slicing of beef hams, tongues, etc., after the pieces have been handled in the ordinary way during the drying or smoking process.

Another object of the invention is to provide an improved holder for shaping and retaining beef hams or other meats in desired form during the subsequent handling and processing thereof.

Another object of the invention is to provide a holder formed of separable members relatively movable with respect to, and operatively related to each other for engagement respectively with various portions of the pieces of meat.

A further object of the invention is to provide a holder having means associated therewith and spaced therefrom which may be employed for convenient handling of the holder, the said means on the respective holders being adapted to cooperate with adjacent or other holders when the latter are placed on the smoke house trolleys or trees, in a manner to space the respective holders from each other, and insure proper circulation of hot gases, smoke, etc., on all sides of the meat pieces, thereby insuring uniform treatment or processing of the pieces contained in the respective holders.

A still further object of the present invention is to improve devices of the character described in sundry details hereinafter referred to and particularly pointed out in the appended claims.

Several forms which the present invention may assume are shown for illustrative purposes in the accompanying drawings in which Fig. 1 is a fragmentary side elevational view of a smoke house trolley or tree illustrating the preferred manner of mounting my improved holder thereon;

Fig. 2 is a perspective view of my improved holder;

Fig. 3 is an enlarged perspective view of a separator adapted for use in conjunction with the preferred form of holder illustrated in Fig. 2;

Fig. 4 is an enlarged elevational view of my improved holder of Fig. 2 showing a plurality of beef hams in position thereon and illustrating the manner of maintaining the hams in desired form and in spaced relation with respect to each other by means of the improved separator illustrated in Fig. 3;

Fig. 5 is an end view of a construction and arrangement showing two of my improved holders connected together and illustrating the manner of mounting them on a smoke house trolley or tree;

Fig. 6 is a plan view of a modified form of the invention illustrating the use of pins or the like for maintaining the hams in desired position on the holder;

Figs. 7 and 8 are end and side elevational views, respectively, of a smoke house trolley illustrating the manner of mounting thereon my improved form of holder illustrated in Fig. 6;

Fig. 9 is a plan view of a further modified construction having means associated therewith for maintaining the hams in desired position on the holder; and Fig. 10 is a fragmentary side elevational view of a trolley illustrating the manner of mounting thereon the structure shown in Fig. 9.

For purposes of description, my improved holder will be described as being of particular advantage in the drying or processing of beef hams commonly known as dried beef, but it will be understood that the holder may be employed in the treatment of other meats, and also in other processes or treatments to which the meat may be subjected, and as may be found desirable.

In the embodiment of the present invention shown for illustrative purposes in Figs. 1, 2, 3 and 4 of the drawings, my improved holder, designated as a whole by the numeral 11 comprises a bottom portion 12, end walls 13 and a side wall 14 extending, preferably, along one side of the bottom portion and, preferably, a substantial distance above the upper edge of the end walls 13. Secured preferably to the bottom portion 12 of the holder 11 is a spacer 15 adapted for engagement with an adjacent holder when a plurality of the devices are positioned on a smoke house trolley or tree as illustrated in Fig. 1.

The holder 11, in the present instance, is of elongated form adapted to receive a plurality of pieces of meat A, as shown in Fig. 4, wherein the pieces are intended to represent beef hams, and for shaping and retaining the pieces in spaced relation with respect to each other, and for aiding in supporting the pieces in substantially upright position, a plurality of separators 16, Figs. 3 and 4, are provided and positioned between the respective pieces of meat as illustrated in Fig. 4, the separators 16, as well as the holder 11, being formed preferably of open-mesh screen-like material to insure proper circulation of hot gases, smoke, etc., around all portions of the pieces of meat to effect the complete and uniform processing thereof.

It will be observed that by the arrangement shown, the separators 16 cooperating with each other, with the ends 13 and side portion 14 of the holder form a plurality of compartments for the reception of individual pieces of meat, and that by reason of the pieces resting on the bottom portion 12 and being engaged by the ends 13, separators 16 and side wall 14, the pieces are formed with regular surfaces on a substantial portion at least three sides, thereby producing a product of pleasing appearance, convenient to handle, and of a form which permits full slices to be cut from the butt end immediately, without trimming away or removing the ragged and uneven surface resulting from the processing of pieces caused by hanging as in the ordinary method of processing.

It will be observed also that in addition to squaring up or smoothing the lower end of the piece and shaping the sides thereof, the present invention also permits the thickening of the pieces, such as beef hams, or other articles, by reason of permitting the piece to settle due by the action of gravity, the thickening being controlled by the position of the separators 16, instead of stretching or narrowing the piece as is caused by hanging in the ordinary method of treatment, thus permitting the making of larger slices such as command a higher price, than small slices.

The spacer 15 is employed in positioning the various holders with respect to each other when placed on the smoke house trolley as clearly shown in Fig. 1, wherein a smoke house trolley or tree indicated as a whole by the numeral 17 is shown as comprising a station or branch 18 suitably mounted on a bar or rod 19 adapted for connection to a trolley bracket 20 supported by means of rollers 21 on a rail 22 by which the trees and their contents may be transported to and from the smoke house and other places as may be desired, it being understood that as many branches 18 may be provided as may be found desirable.

It will be noted that by the arrangement shown in Fig. 1, the spacers 15 serve to uniformly space the respective holders with respect to each other, and in conjunction with the open-mesh screen like structure of the holders 11 and separators 16, insure uniform treatment or processing of the pieces contained in the respective holders.

Fig. 5 illustrates a double holder formed by connecting the upper edges of the side walls 14 of the pair of holders together and maintaining the respective holders of the pair in desired position by one or more brace rods 23 which may be positioned crosswise of the branches 18 of the smoke house trolley as shown in Fig. 5.

In Figs. 6, 7 and 8 is shown a modified form which the present invention may assume, the construction shown comprising a supporting member indicated as a whole by the numeral 11a having a bottom portion 12a, on which the butt end of the beef hams are intended to rest, and a side wall 14a provided with a plurality of relatively short pins 24 for maintaining the pieces of meat in substantially fixed position and in spaced relation with respect to each other.

The bottom portion 12a, in the arrangement shown in Figs. 6, 7 and 8, is provided with a spacer 15a adapted to cooperate with adjacent holders, as clearly shown in Fig. 8 for positioning the respective holders in spaced relation with respect to each other, and in conjunction with the open-mesh screen-like material of which the holder is formed, insuring uniform treatment or processing of the pieces mounted on the respective holders.

In Figs. 9 and 10 is illustrated a further modification of the present invention, wherein a holder formed of open-mesh screen-like material, and indicated as a whole by the numeral 11b comprises a bottom portion 12b on which the lower or butt ends of the beef hams are intended to rest, and a side wall 14b extending longitudinally of the holder, the side wall 14b being formed with a plurality of spaced convolutions providing pockets 25 for the reception of beef hams A or other articles to be processed or treated, the portions 26 formed in the wall 14b between the pockets 25 or at opposite sides thereof serving to space the hams or other meats with relation to each other and to maintain them in substantially upright position on the bottom member 12b.

Secured to the holder 11b, preferably adjacent the bottom portion thereof, is a spacer 15b adapted to engage and cooperate with adjacent holders for positioning them in spaced relation with respect to each other on smoke house trolleys or trees as clearly shown in Fig. 10.

While the invention, in the present instance, has been described with reference to the treatment of beef tongues, boneless shoulder butts, and particularly dried beef hams during the smoking and/or drying process, it will be obvious that the invention may be used to advantage in maintaining pieces of meat in desired form during other processes or treatment, as for example, during the chilling or cooling processes to which certain meats are sometimes subjected.

It will be observed from the foregoing description that the present invention provides a holder comprising supporting and separating means forms of suitable open-mesh or screen-like material, the separating means in one form of the invention being readily movable bodily with respect to the supporting means and other separators, and which may be conveniently and readily applied to a piece or pieces of meat for shaping and maintaining the pieces in desired form during the various processes to which the meat may be subjected. The present invention also contemplates structure including means for suitably spacing the respective holders and pieces of meat contained therein in a manner to insure efficient and uniform treatment of the pieces during the operation of the process to which the meat may be subjected, and also that the use of the present invention produces a finished product of improved appearance and form which serves to greatly enhance its marketability.

Obviously, the present invention is not limited to the precise construction and arrangement shown and described, as the same may be variously modified. Moreover, all the features of the invention need not be used conjointly, as the same may be used to advantage in variously different combinations and sub-combinations.

What I claim as new and desire to secure by Letters Patent is:

1. A holder of the class described comprising, in combination, an open-mesh basket-like member having a bottom portion, end walls and a side wall extending above said end walls, a plurality of hollow separators formed of screen-like material and of a height substantially equal to that of said end walls and movably mounted on said bottom portion between the end walls to provide a plurality of spaced compartments for the reception of pieces of meat, respectively, and a spacer operatively related to the holder.

2. A holder of the class described comprising, in combination, a supporting member formed of screen-like material adapted for receiving a plurality of pieces of meat and having a bottom portion and a side wall positioned at an angle to said bottom portion, a plurality of pins carried by said side wall and engageable with said meat for maintaining the respective pieces in relatively fixed position on said supporting member, and a spacer connected to said bottom portion and adapted for engagement with other holders for spacing adjacent holders with respect to each other.

3. A holder of the class described comprising, in combination, a supporting member formed of screen-like material having a bottom portion and a side wall positioned at an angle to the bottom portion, said side wall having a plurality of convolutions formed therein to provide a plurality of pockets for respectively receiving pieces of meat.

4. A holder of the class described comprising, in combination, a supporting member formed of screen-like material having a substantially flat bottom portion and a side wall positioned at an angle to the bottom portion, said side wall having a plurality of spaced convolutions formed therein to provide a plurality of spaced pockets for respectively receiving pieces of meat in a manner to retain the respective pieces in spaced relation with respect to each other, and a spacer connected to said bottom portion and adapted for engagement with other holders for spacing adjacent holders with respect to each other.

ALONZO N. BENN.